(12) United States Patent
Zikeli et al.

(10) Patent No.: US 7,004,188 B2
(45) Date of Patent: Feb. 28, 2006

(54) ANTI-RUPTURE DEVICE

(75) Inventors: Stefan Zikeli, Regau (AT); Friedrich Ecker, Timelkam (AT)

(73) Assignee: Zimmer A.G., Frankfurt am Main (DE)

( * ) Notice: Subject to any disclaimer, the term of this patent is extended or adjusted under 35 U.S.C. 154(b) by 337 days.

(21) Appl. No.: 10/276,841

(22) PCT Filed: Apr. 19, 2001

(86) PCT No.: PCT/EP01/04466

§ 371 (c)(1),
(2), (4) Date: Apr. 29, 2003

(87) PCT Pub. No.: WO01/88419

PCT Pub. Date: Nov. 22, 2001

(65) Prior Publication Data

US 2003/0183274 A1 Oct. 2, 2003

(30) Foreign Application Priority Data

May 18, 2000 (DE) .............................. 100 24 539

(51) Int. Cl.
*F16K 17/40* (2006.01)
(52) U.S. Cl. ................ 137/68.27; 137/340; 137/68.23; 165/278
(58) Field of Classification Search ............ 137/68.19, 137/68.23, 68.27, 340; 220/89.2; 165/154, 165/278, 281
See application file for complete search history.

(56) References Cited

U.S. PATENT DOCUMENTS

| 218,052 | A | * | 7/1879 | Neath ..................... 137/68.19 |
| 3,319,657 | A | * | 5/1967 | Nyiri ........................... 137/59 |
| 4,913,184 | A | | 4/1990 | Fallon ......................... 137/71 |
| 6,173,767 | B1 | * | 1/2001 | Kennon ...................... 165/278 |

FOREIGN PATENT DOCUMENTS

| DE | 36 40 958 A1 | 6/1988 |
| EP | 0 789 822 | 2/1998 |
| EP | 0 662 204 B1 | 4/1998 |
| FR | 75191 | 9/1961 |
| WO | WO 94/08162 | 4/1994 |
| WO | WO 97/08482 | 3/1997 |

* cited by examiner

*Primary Examiner*—John Rivell
(74) *Attorney, Agent, or Firm*—McDonnell Boehnen Hulbert & Berghoff LLP

(57) ABSTRACT

The invention relates to a fluid conduit piece (8) for passing therethrough a spontaneously exothermic working fluid such as a synthetic polymer, a cellulose derivative and a solution on the basis of cellulose, water and amino oxide, said fluid conduit piece comprising a working fluid zone (9) through which said working fluid flows. The aim of the invention is to prevent the fluid conduit piece and other fluidic devices from being damaged in the event of a spontaneous exothermic reaction in the working fluid. To this end, the fluid conduit piece is provided with an anti-rupture device (1) for the purpose of pressure relief. Said anti-rupture device has a pressure equalizing volume (7) that, once a predetermined rupture pressure is exceeded, can be converted from a normal operation state in which the pressure equalizing volume is separated from the working fluid zone into a rupture state in which the pressure equalizing volume is linked with the working fluid zone. The pressure equalizing volume is at least partially disposed in the working fluid zone and the working fluid at least partially flows around it, thereby reducing the size of the fluid conduit piece.

39 Claims, 2 Drawing Sheets

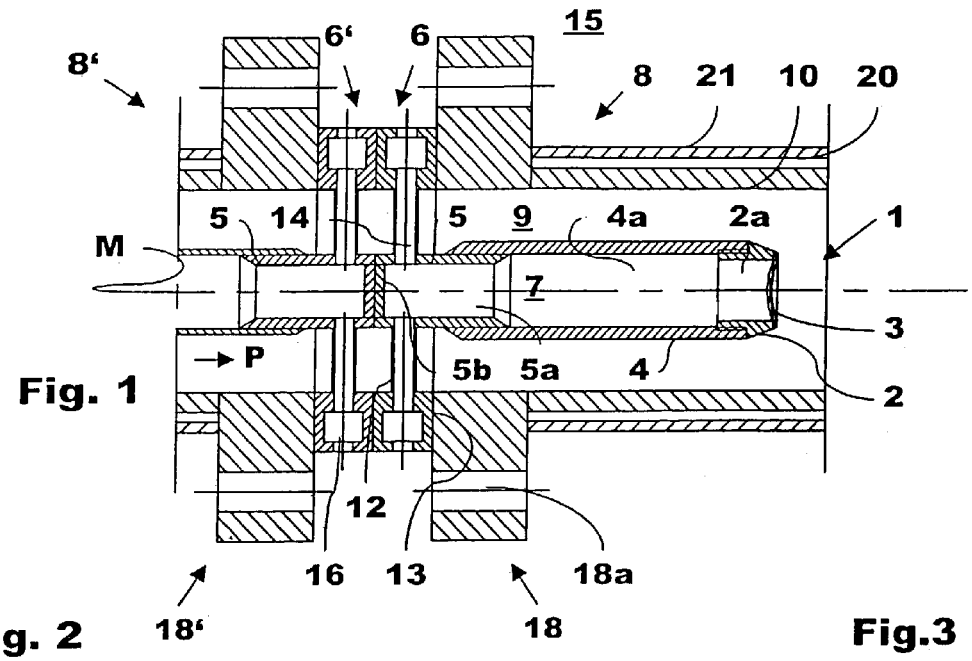
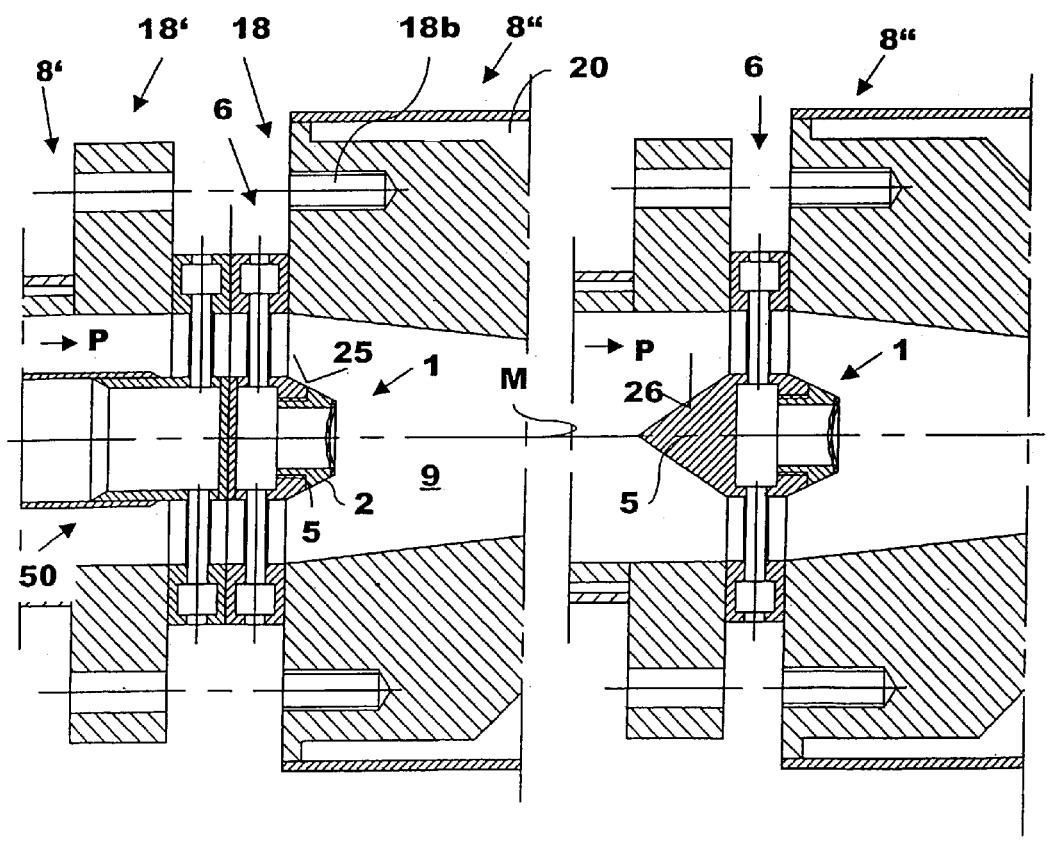
Fig. 1
Fig. 2  Fig. 3

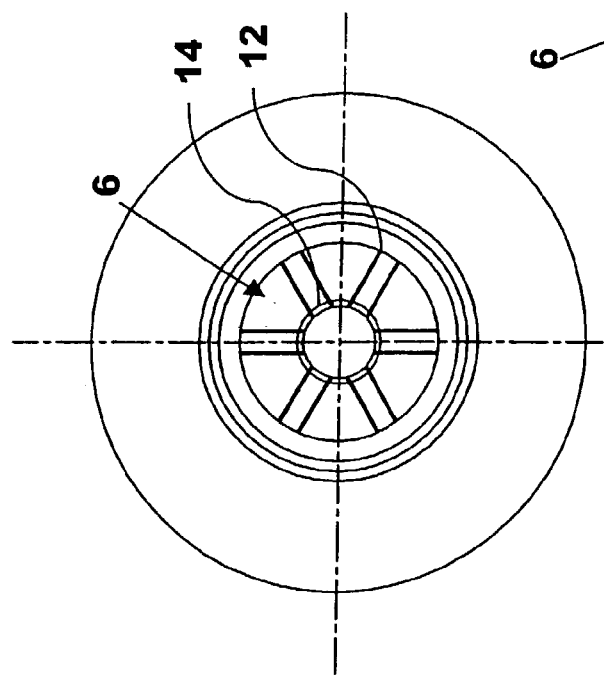
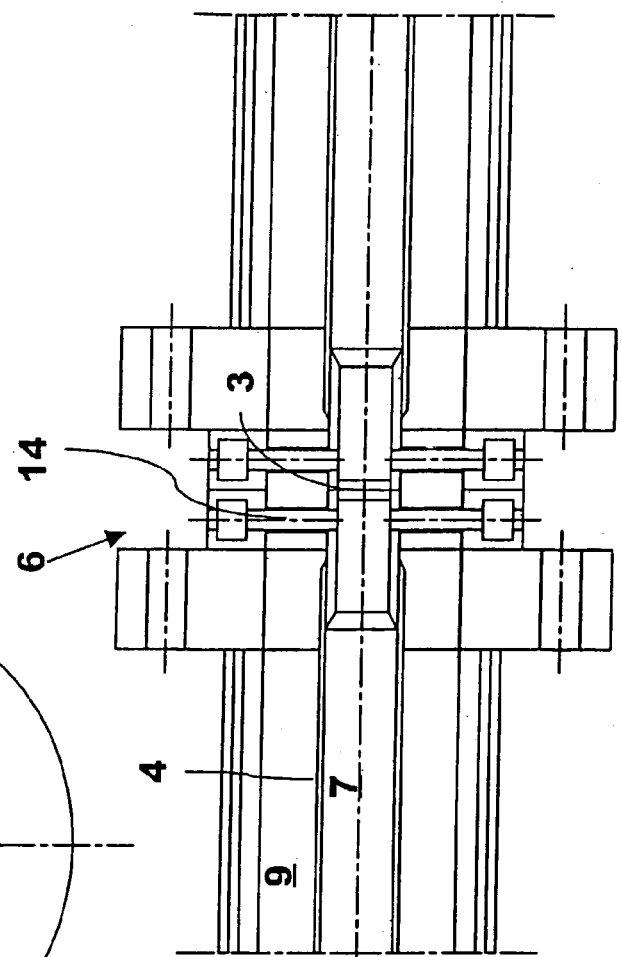
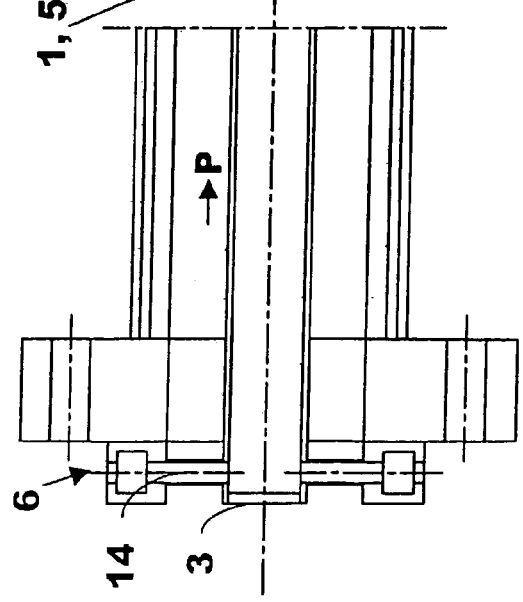

ANTI-RUPTURE DEVICE

The present invention relates to a burst protection device for a fluid line member for passing therethrough a working fluid showing a spontaneous exothermic reaction, e.g. a synthetic polymer or a polymer solution, a cellulose derivative or a solution consisting of cellulose, water and amine oxide, as well as mixtures thereof, the fluid line member comprising a working fluid line portion through which the working fluid flows, and the burst protection device comprising a pressure compensating volume which, when a predetermined burst pressure in the working fluid is exceeded, can be transferred from a normal operative state in which the pressure compensating volume is separated from the working fluid line portion, into a burst state in which the pressure compensating volume is connected to the working fluid line portion, the burst protection device comprising at least one fastening body by which the pressure compensating volume is kept at least sectionwise within the working fluid line portion and in a state where it is circumflown by the working fluid at least sectionwise, and the pressure compensating volume being connected to the outside of the fluid line member.

The fluid line members equipped with such a burst protection device are e.g. simple pipes and are conventionally used in spinning facilities in which the working fluid is spun as a molding material into molded bodies. In general, the working fluid is transported through the fluid line member from a reaction tank in which it is blended, to a spinneret at which it is spun.

The working fluids used are heat-sensitive and tend to carry out a spontaneous exothermic reaction whenever a specific maximum temperature is exceeded in the fluid line member or also below said maximum temperature when the working fluid is stored for an excessively long period of time.

A working fluid that is particularly suited for spinning is a molding material which consists of a spinning solution containing cellulose, water and a tertiary amine oxide, such as N-methylmorpholine N-oxide (NMMO) as well as stabilizers for the thermal stabilization of the cellulose and the solvent and, optionally, further additives, such as titanium dioxide, barium sulfate, graphite, carboxymethyl celluloses, polyethylene glycols, chitin, chitosan, alginic acid, polysaccharides, dyes, antibacterially acting chemicals, flameproofing agents containing phosphorus, halogens or nitrogen, activated carbon, carbon blacks or electrically conductive carbon blacks, silicic acid, organic solvents as diluents, etc.

A high reaction pressure is created during a spontaneous exothermic reaction in the working fluid. The technical devices of the spinning facilities through which the working fluid is flowing, e.g. a pump, fluid line members, heat exchangers or pressure compensating tank, may get damaged by the reaction pressure propagating in the working fluid.

Therefore, in the case of a spontaneous exothermic reaction it is known in the prior art that burst protection devices are provided for fluid line members, whose function is to reduce the reaction pressure as fast as possible, thereby preventing further damage caused by the reaction pressure on expensive devices.

In conventional fluid line members, such as those used in EP 0 626 198 A1, WO 94/08162, WO 99/00185, the burst protection device is provided with a pressure compensating volume which during standard operation is separated from the working fluid in the working fluid line portion. Whenever a predetermined burst pressure is exceeded, the burst protection device assumes a burst state in which the pressure compensating volume is connected to the working fluid line portion. The reaction pressure in the line system can be reduced by the volume which is now additionally available in case of bursting.

Normally, the burst devices with the pressure compensating volume are arranged on the jacket surface of the working fluid line portion.

The drawback of said conventional burst protection devices located on the outside is that they entail excessively large constructional volumes in the fluid line members. Therefore, the fluid line members equipped in this way require a lot of installation space and create undesired dead water zones in the working fluid. Moreover, conventional burst devices require expensive alterations in the commercially available pipe systems which the fluid line members are composed of as a rule. As a result, the production costs of fluid line members with burst protection devices for use in working fluids with a spontaneous exothermic reaction are high.

EP 789 822 B1 and EP 662 204 B1 describe burst protection devices which are used in specifically adapted fluid line members which are complicated to manufacture. In the closest prior art, EP 789 822 B1, the predetermined breaking section of the burst protection device is not part of the inner wall of the pipe but is arranged in the interior of the pipe. In the device of EP 662 204 B1, the predetermined breaking section is part of the inner wall of the pipe.

In view of these drawbacks it is the object of the present invention to improve the existing burst protection devices for fluid line members such that small constructional volumes are possible and that the production costs of the line systems and the neighboring auxiliary systems can be lowered.

This object is achieved for a burst protection device of the above-mentioned type in that the fastening body is designed to be mountable between two fluid line members.

On account of the pressure compensating volume which is arranged at least sectionwise within the working fluid line portion and circumflown at least sectionwise by the working fluid, space can be saved in comparison with conventional burst protection devices because the pressure compensating volume is arranged within the cross section of the fluid line member. Apart from a reduction of the production costs, this simple measure prevents the formation of dead water zones because simple pipes that need no further machining can now be used for the exterior region of the working fluid line portion.

In a particularly advantageous design the pressure compensating volume may be connected to the outside of the fluid line member, and at least one pressure relief line is provided that leads from the pressure compensating volume to the outside of the fluid line member. With this design the pressure compensating volume can be connected to external devices and equipment that are connected to the pressure relief line. These external devices may e.g. be pressure and temperature measuring devices, or outlet systems by which the working fluid can be discharged which in the burst state enters into the pressure compensating volume under the effect of the reaction pressure and exits through the pressure relief line.

Advantageously, the pressure compensating volume may be formed by a substantially tubular inner body. With such a design commercial components can be used without the need for an expensive aftertreatment.

To expose the pressure compensating volume, if possible, on all sides to the pressure within the working fluid, the pressure compensating volume or the inner body forming the pressure compensating volume may be kept in a further advantageous development by means of spacers at a distance from an outer wall of the working fluid line portion. With such a design one obtains a substantially annular cross-section of the working fluid line portion. This creates a particularly advantageous basis for further influencing and controlling the flow of the working fluid through the fluid line member.

A separate pressure relief line can be dispensed with if the pressure relief line is arranged within a spacer in a further advantageous development. With such a double function a negative effect on the flow through the working fluid line portion can be avoided.

The influence of the spacer on the flow of the working fluid can once again be reduced if in an advantageous development the spacer has a substantially streamline-shaped cross-section.

The production process of the fluid line member according to the invention can be rationalized if in a further advantageous development the spacer is formed on the fastening body. As a result, the burst protection device can be installed—solely because of the use of various standardized fastening bodies—in a multitude of fluid line members having different diameter sizes without the need for changing the whole burst protection device for the respectively different diameters of the fluid line members. An adaptation takes solely place by selecting the suitable fastening body. The fastening body may in particular be star-shaped or in the form of a spoke wheel.

To permit a symmetrical flow around the pressure relief volume, the volume may be arranged in the center of the working fluid line portion and thus replaces the core flow of the working fluid. A uniform velocity distribution is achieved in the working fluid through the symmetrical flow around the pressure compensating volume. With an asymmetrical velocity distribution there would be the risk that stagnation zones in which the working fluid ages are formed in the flow of the working fluid. This would increase the risk of spontaneous exothermic reactions.

In an advantageous development the burst protection device may comprise at least one predetermined breaking section which is exposed to the pressure prevailing in the working fluid line portion and adjoins the pressure compensating volume and whose strength is reduced in comparison with its surroundings. The predetermined breaking section forms a controlled weakened point which when the burst pressure is exceeded in the working fluid tears or breaks and discharges the reaction pressure to the pressure compensating volume.

The predetermined breaking section may be integrally integrated into a wall of the pressure compensating volume or may detachably be mounted on a separate bursting body on the burst protection device. In the last-mentioned case the bursting body can deform in the state of bursting or be detached from its mounting.

The bursting body may in particular be designed as a bursting disc by which in the normal operative state the one end face of the tubular body is closed. The bursting disc may have a circular shape. The detachable connection of the bursting body permits a replacement of the bursting body when the state of bursting has occurred. A further inventive design consists in the mounting of the predetermined breaking section on the jacket of the tubular body of the burst protection device. In such a case the predetermined breaking section is not of a circular type but has a rectangular or oval form, preferably in axial direction, in parallel with the center axis.

To minimize flow losses and to avoid stagnation zones, the bursting body may have a substantially streamlined outer shape.

In a further, particularly advantageous development the burst protection device may simultaneously serve as an internal temperature-control device whose temperature can be controlled at least sectionwise in the area flown around by the working fluid for controlling the temperature of the working fluid. Thanks to this double function the temperature of the working fluid can be varied by the burst protection device from within the annular working-fluid line portion. In comparison with a heating of the outer wall of the working fluid line portion the thickness of the working fluid layer to be temperature-controlled is reduced because of the at least approximately annular flow cross-section.

In a conventional pipe without baffles said thickness is equal to the diameter; with an annular design of the working fluid line portion said layer thickness is drastically reduced because the annular thickness is the relevant size for the working fluid layer to be temperature-controlled. The reduced layer thickness permits a faster heat transfer and a more accurate control of the temperature within the working fluid.

A particularly high synergetic effect can be achieved when the pressure compensating volume is simultaneously used for receiving a temperature control fluid. The temperature of the temperature control fluid is advantageously controllable by a control device so that the temperature in the working fluid can be adjusted via the temperature control fluid. In comparison with e.g. electrical temperature-control systems a temperature control fluid has the advantage that there are no locally very different temperature distributions, but a uniform heat exchange is possible between temperature control fluid and working fluid.

The temperature control fluid can be used for heating and also for cooling the working fluid, depending on whether its temperature is higher or lower than the temperature of the working fluid. The temperature control fluid may be liquid or gaseous.

When the burst protection device is used as an internal temperature control device and upon use of a temperature control fluid, the pressure relief line can serve in a further advantageous development in a double function as a feed line for the supply of the temperature control fluid.

To increase the area via which the heat exchange is controlled for controlling the temperature of the working fluid, the fluid line member in a further advantageous development may comprise a jacket temperature control device which surrounds the working fluid line portion at least sectionwise, and whose temperature is controllable by a control means.

Advantageously a jacket temperature control device may form a cavity through which a temperature control fluid is flowing. The temperature of the temperature control fluid may differ from the temperature of the working fluid. As has already been mentioned above, the advantage consists in the use of a temperature control fluid with a uniform temperature distribution and heat transfer without local temperature peaks.

To protect the working fluid against external factors, the working fluid line portion may be covered in a further advantageous development by a thermal insulation layer at least sectionwise.

As for the stability and manufacture of the fluid line member, it may be particularly advantageous when the spacer is arranged at an end of the fluid line member that is positioned in the direction of passage of the working fluid.

In the above-described developments the fluid line member may assume any functional form that is standard in line engineering.

For instance, the fluid line member of the invention may be designed as a straight pipe member or as a pipe member of any desired curvature, as a manifold member for the connection of further fluid line members in Y shape, T shape or in any other three-dimensional shape, as an end member having only one connecting section for the connection of only one further fluid line member, or as a reducer whose flow cross-section having the working fluid flowing therethrough is smaller at an end positioned in the direction of passage of the working fluid than at the end opposite to the direction of passage. Such a reducer may be used to provide transitions between different fluid line members. A pump for conveying the working fluid, as well as one or several filters, heat exchangers or mixing reactors may also be provided in the fluid line member.

Any material that is corrosion-resistant with respect to the working fluid and pressure-resistant with respect to possible exothermic reactions may be used as a material for the burst protection device, the working fluid line portion or the temperature-control jacket section. A possible material is steel, special steel or chromium-plated steel. To minimize adhesion and friction of the working fluid on the walls, the outer wall of the temperature control device or the inner wall of the working fluid line portion may be treated to be particularly smooth or may be provided with a friction-minimizing coating.

The invention also relates to fluid line members equipped with the above-described burst protection device.

Furthermore, the present invention relates to a modular fluid line system consisting of fluid line members, of which at least one comprises a burst protection device according to the invention. For the construction of the fluid line systems the fluid line members are connected one after the other. A fluid line member with an internal temperature-control device and a fluid line member with a burst protection device may be arranged in alternate fashion.

The invention also relates to a facility for processing polymer solutions comprising a fluid line system of a modular structure including fluid line members which are provided at least in part with temperature control devices and built-in apparatuses and fittings, such as pumps, filters, heat exchangers, mixing reactors or tanks, ball valves, etc., and including fluid line members with burst protection devices that are arranged at regular intervals.

The invention will now be described in the following with reference to embodiments taken in conjunction with the figures, of which:

FIG. 1 shows a first embodiment of a burst protection device according to the invention in a longitudinal section;

FIG. 2 shows a second embodiment of a burst protection device according to the invention in a longitudinal section;

FIG. 3 shows a third embodiment of a burst protection device according to the invention in a longitudinal section;

FIG. 4 shows a fourth embodiment of a burst protection device according to the invention in a longitudinal section;

FIG. 5 shows the embodiment of FIG. 4 in a section taken along line A—A of FIG. 4.

First of all, the structure of the first embodiment of a burst protection device according to the invention will be described with reference to FIG. 1.

FIG. 1 shows a first embodiment of a burst protection device 1 according to the invention. The burst protection device 1 comprises a bursting body 2 with a central passage opening 2a and a bursting disc 3. The bursting body 2 is connected in a detachable and tight manner to a tubular inner body 4 which in turn is tightly mounted on a tubular section 5 of a fastening body 6. The burst protection device 1 is rotationally symmetrical relative to a center line M.

The burst protection device 1 forms a pressure compensating volume 7 which is formed by the central passage opening 2a, the interior 4a of the inner body 4 and a central opening 5a.

The burst protection device 1 is mounted by way of the fastening body 6 on a substantially tubular fluid line member 8 in which a working fluid flows in direction P in a substantially annular working-fluid line portion 9 between wall 10 of the fluid line member 8 and the outer wall of the inner body 4.

The fluid line member of FIG. 1 is specifically designed for passing a spinning solution as a working fluid therethrough, the spinning solution containing water, cellulose and tertiary amine oxide. The fluid line member is used in a spinning facility in which the spinning solution is conveyed through the fluid line system consisting of a plurality of successively arranged fluid line members 8 from a reaction tank (not shown), in which the spinning solution is produced, to an extrusion head by which the spinning solution is extruded into molded bodies. The spinning solution tends to carry out an exothermic reaction whenever it is heated above a specific temperature or when it is stored at specific temperatures for a long period of time.

The pressure compensating volume 7 is arranged to be coaxial to and spaced apart from the wall 10 in the center of the fluid line member, thereby assuming the position of the core flow of the working fluid. To keep the burst protection device 1 in said position, the fastening body 6 is provided with spacers 12 which are circumferentially spaced apart and extend in radial direction or in the form of spokes from the tubular section 5 into the flow of the working fluid and end in an annular body 13 which towards the working-fluid line portion 9 ends flush with the outer wall 10. The pressure compensating volume 7 of the embodiment of FIG. 1 may be filled with a gas that is inert with respect to the working fluid or with a liquid that is inert with respect to the working fluid, for instance with water.

The central opening 5a of the tubular section 5 of the fastening body 6 is closed by a closing body 5b at the side facing away from the pressure compensating volume 7. In the embodiment the closing body 5b is shaped in the form of a disc.

To keep flow losses as small as possible while the working fluid is flowing through the system, and to prevent the formation of stagnation zones in which the working fluid may age, the spacers 12 have a streamlined cross-section. Pressure relief lines 14 which connect the pressure compensating volume 7 to the outside 15 of the fluid line member 8 are provided in any desired number of the spacers 12 of the fastening body 6.

The pressure relief lines 14 end in an annular chamber 16 which is connected via connection lines (not shown) to connections at which further equipment can be connected. The connections serve to tightly connect the pressure compensating volume 7 to such equipment, for instance, in order to measure the pressure and/or the temperature or other variables of state in the pressure compensating volume or to discharge working fluid entering into the pressure compensating volume 7 from the fluid line system.

The specific burst protection device arrangement ratio V is calculated from $V=L/\sqrt{(D_{AD})}$, where L designates the distance in mm between two neighboring burst devices and an adequate diameter $D_{AD}$ is calculated in mm from $D_{AD}=\sqrt{(D_A^2-D_I^2)}$. The value $D_A$ designates the outer diameter and $D_I$ the inner diameter of the annular working-fluid line portion 9 in mm. The specific burst protection device arrangement ratio V is less than 3000, preferably less than 2000, most preferably less than 1500. These ratios are necessary to avoid excessively long discharge paths for the working fluid to the burst device—above all in the case of small lines—when the burst pressure is exceeded.

The specific pressure compensating volume is calculated as $L \cdot D_{AD}^2 \cdot \pi/4$, where L is the length of the pipe portion to be protected, $D_A$ the outer diameter and $D_I$ the inner diameter of the annular working-fluid line portion 9. The specific pressure compensating volume is less than 500 liter, preferably less than 300 liter, most preferably less than 150 liter. These orders of magnitude are necessary to provide enough space per volume of working fluid in case of an exothermic reaction for the working volume displaced by the reaction. A length L is assigned to each burst protection device to discharge the working fluid from said pipe section.

For fastening several fluid line members one after the other, a connecting section 18 is provided on each fluid line member, the connecting section 18 being connectable to the connecting section 18' of the next fluid line member 8' for forming a fluid line system of a modular structure. To this end the connecting section 18 is flange-shaped and provided with passage openings 18a. Screws (not shown) can be put through the passage openings 18a so that a screw connection interconnects the fluid line members 8, 8'. Any other configuration of the connecting section 18 that serves the same purpose may be used with the same effect.

The fastening section 6 of a fluid line member 8 is clamped in sandwich-like fashion between the respective connecting sections 18, 18' when the fluid line system is built up from fluid line members 8, 8'. Stops, centering bores, etc. may be provided for positioning purposes in radial direction. Likewise, sealing elements (not shown) may be mounted in the central direction M between the fastening body 6 and the connecting section 18 or between two adjoining fastening bodies 6, 6'.

The fluid line member 8 of the embodiment shown in FIG. 1 is further provided with a jacket temperature control device which comprises an annular cavity 20 surrounding wall 10. Cavity 20 is enclosed by an outer pipe 21 and extends from an end of the fluid line member, which is positioned in the central direction M, to the other end. A temperature control fluid having a temperature differing from that of the working fluid flows through cavity 20 in the direction of flow P of the working fluid or in a direction opposite to direction P.

The temperature of the working fluid in the working fluid line portion 9 is controlled by the jacket temperature control device. To this end the temperature of the temperature control fluid is kept by a control device (not shown) at a specific temperature that may be higher or lower than the temperature of the working fluid.

The function of the burst protection device 1 according to the invention shall now be explained in the following with reference to the embodiment of FIG. 1.

The burst protection device 1 is to prevent any damage to devices that is caused by the reaction pressure produced in the case of a spontaneous exothermic reaction of the working fluid in the fluid line member. To this end the burst protection device 1 discharges the reaction pressure to the outside of the fluid line member.

The burst protection device is shown in FIG. 1 in a normal operative state in which the pressure compensating volume 7 is separated by the bursting disc 3, the bursting body 2, the wall of the inner body 6 and the wall of the tubular section 5 from the working fluid in the working fluid line portion 2.

In the case of a spontaneously occurring exothermic reaction of the working fluid the pressure in the fluid line member 1 rises suddenly. When a predetermined burst pressure is exceeded in the working fluid, the burst protection device is transferred into the burst state and the bursting disc 3 breaks: The working fluid flows into the pressure compensating volume 7. The working fluid is discharged from the pressure compensating volume 7 via the pressure relief lines 14 and the connections (not shown), and the reaction pressure is reduced rapidly.

The wall thicknesses of elements 2, 4, 5, 5a, 6, 12 are all dimensioned such that they can withstand the reaction pressure without being damaged. Likewise, the fluid line member 8 is capable of withstanding the reaction pressure without damage. It is thereby ensured that only the bursting disc 3 will break upon an exothermic reaction of the working fluid.

The broken bursting disc 3 can easily be replaced by exchanging the bursting body 2. To this end the bursting body is detachably connected to the inner body 4. In the embodiment shown in FIG. 1, a self-sealing thread is used for connecting inner body 4 and bursting body 2.

Instead of the bursting disc 3 other variants may also be employed. For instance, individual wall portions of the elements 2, 4, 5, 5a, 6, 12 can be designed as predetermined breaking points with respect to their surroundings. When the burst pressure is exceeded, these predetermined breaking points establish a connection between the working fluid line portion 9 and the pressure compensating volume 7.

The length of the inner body 4 in the central direction M is arbitrary. The inner body 4 may in particular extend over the whole length of the fluid line member 8. To hold the inner body 4 in such a case, it may be held at both ends by fastening bodies 6.

The construction of the second embodiment of the burst protection device according to the invention shall now be described with reference to FIG. 2.

In FIG. 2 identical reference numerals are used for elements the function of which corresponds to that of the elements shown in FIG. 1. For the sake of simplicity only the differences between the first and the second embodiment shall be discussed.

The burst protection device according to FIG. 2 has no inner body 4. Rather, the bursting body 2 is directly connected to the tubular section 5 of the fastening body 6. A screw connection is used for connecting members 2 and 6.

The overall length in the central direction M or the direction of flow P of the working fluid is shorter in the embodiment of FIG. 2 than in the embodiment of FIG. 1. As a result, the burst protection device according to the second embodiment is particularly designed for installation in fluid line members 8" that serve as reducers. In a reducer 8" the flow cross-section of the working fluid line portion 9 is reduced in the direction of flow P. To avoid a blocking of the flow cross-section, the burst protection device should therefore not project into the decreasing flow cross-section.

To disturb the flow within reducer 8" as little as possible, the burst device is streamlined in the area of the tubular section 5 and of the bursting body 2. In the embodiment shown in FIG. 2 a tapering surface 25 is provided for.

The reducer also comprises a jacket temperature control device with a cavity 20.

The fastening section 18" of the reducer 8" has provided therein a threaded opening 18b into which a fastening screw projects for establishing a connection of the reducer 8' with a further fluid line member.

The function of the burst device of FIG. 2 is the same as in FIG. 1.

The reducer 8" is also provided with a connecting section 18 to which the connecting section 18' of a further fluid line member 8' can be fastened.

The fluid line member 8' as shown has installed therein an internal temperature control device 50 which also uses the fastening body 6. Thanks to its diverse usability in a multitude of baffles in fluid line members for spinning facilities the fastening body constitutes an invention of its own, which is independently protectable. The diameters of the baffles in the working fluid line portion 9 have the same dimensions so that successively arranged baffles 1, 50 ensure a smooth cylindrical surface.

The burst protection device 1 and the internal temperature control device 50 abut smoothly on one another at the closed axial ends of the inner body. The internal temperature control device 50 shall be described further below.

The construction of the third embodiment of the burst protection device according to the invention shall now be described with reference to FIG. 3.

Identical reference numerals are used in FIG. 3 for elements the function of which corresponds to that of the elements shown in FIG. 2. For the sake of simplicity only the differences between the second and third embodiment shall be discussed.

The burst protection device 1 according to the third embodiment is intended for the isolated installation into a fluid line system consisting of at least two fluid line members 8, 8' or 8". To this end the tubular section 5 is provided at a side directed into the direction of flow P of the working fluid with a streamlined lining 26 by which the flow of the working fluid can be divided without any loss. In the case of an installation which is opposite with respect to the direction of flow P, the flow can be combined again by the lining 26 without any losses.

As shown in FIG. 3, the lining may be made integral with the tubular section 5. Alternatively, the closing means 5b may have a streamlined shape.

The construction of the fourth embodiment of the burst protection device of the invention shall now be described with reference to FIG. 4.

Identical reference numerals are used in FIG. 4 for elements the function of which corresponds to that of the elements of FIG. 1. For the sake of simplicity only the differences between the first and the fourth embodiment shall be discussed.

In the embodiment shown in FIG. 4, the burst protection device 1 fulfills a double function as an internal temperature control device 50. The internal temperature control device 50 serves to control the temperature of the working fluid in the working fluid line portion 9 from the inside. Like the jacket temperature control device, the internal temperature control device 50 has a temperature control fluid flowing therethrough for such a purpose.

Normally, fluid line members with an internal temperature control device and fluid line members with a burst protection device are arranged one after the other, preferably in alternating fashion. However, internal temperature control device and burst protection device may also be combined.

To this end the inner body 4 is mounted at both ends with fastening bodies 6 replacing the core flow in a fluid line member 8. At both ends of the inner body 4 the pressure compensating volume 7 is connected to the pressure relief lines 14 of the two fastening means 6. The two pressure relief lines 6 serve as feed lines for the supply of a gaseous or liquid temperature control fluid into the pressure compensating volume 7. Depending on the direction of feed the temperature control fluid in the internal temperature control device 50 may flow in the direction of (co-current flow) or in a direction opposite (countercurrent flow) to the direction of flow P of the working fluid.

In the embodiment shown in FIG. 4 bursting discs 3 are mounted at both axial ends of the combined burst-protection and internal temperature-control device 1, 50. To this end one of the embodiments shown in FIGS. 1 to 3 may be used. Alternatively, a burst protection device may only be provided at one end.

As shown in FIG. 4, the bursting disc may also be directly mounted on the tubular section of the fastening body 6 without the use of a bursting body 3. This design is independent of its use in an internal temperature control device.

With the internal temperature control device the temperature in the annular flow cross-section of the working fluid line portion 9 can be adjusted in a particularly accurate manner because a large area for the heat transfer between temperature control fluid and working fluid is available thanks to the internal temperature control device 50 and the jacket temperature control device 20, and the thickness of the working fluid layer to be temperature-controlled is small in the annular gap at the same time.

Depending on whether the temperature of the temperature control fluid in the internal temperature control device is higher or lower than the temperature of the working fluid, the working fluid is cooled or heated. This is also true for the jacket temperature control device, with the temperature control fluids of internal temperature control device and jacket temperature control device possibly being part of independent supply systems.

When the burst pressure is exceeded, the bursting disc 3 breaks and the working fluid flows into the pressure compensating volume. To avoid reactions between the working fluid and the temperature control fluid, the temperature control fluid should be inert with respect to the working fluid.

As above, the reaction pressure is discharged via the pressure relief means 14. To prevent any damage to the temperature-control fluid system, protection devices, such as check valves, which prevent damage to said systems caused by the reaction pressure may be provided between the pressure compensating volume and the supply system for the temperature control fluid.

What is claimed is:

1. A burst protection device for a fluid line member for passing therethrough a spontaneously exothermally reacting working fluid, said fluid line member comprising a working fluid line portion flown through by the working fluid, and said burst protection device comprising a pressure compensating volume which when a predetermined burst pressure is exceeded in the working fluid can be transferred from a normal operative state in which the pressure compensating volume is separated from the working fluid line portion, into a burst state in which the pressure compensating volume is connected to the working fluid line portion, the burst protection device comprising at least one fastening body by which the pressure compensating volume is kept at least sectionwise within the working fluid line portion and in a state where it is circumflown by the working fluid at least sectionwise, and the pressure compensating volume being connected to the outside of the fluid line member wherein the fastening body is designed to be mountable between two fluid line members.

2. The burst protection device according to claim 1, wherein there is provided at least one pressure relief line leading from said pressure compensating volume to the outside of the fluid line member.

3. The burst protection device according to claim 1, wherein the pressure compensating volume is formed by a substantially tubular inner body.

4. The burst protection device according to claim 1, wherein at least one spacer is provided which projects into the working fluid and by which said pressure compensating volume is kept spaced-apart from an outer wall of said working fluid line portion.

5. The burst protection device according to claim 4, wherein pressure relief line is arranged in a spacer.

6. The burst protection device according to claim 4, wherein the spacer has a substantially streamlined cross-section.

7. The burst protection device according to claim 4, wherein the spacer is formed on said fastening body.

8. The burst protection device according to claim 7, wherein the fastening body comprises a plurality of spacers which are distributed in circumferential direction and preferably designed in the manner of spokes.

9. The burst protection device according to claim 1, wherein the fastening body has a tubular section to which the inner body of a temperature control device or the burst protection device can be fastened.

10. The burst protection device according to claim 1, wherein the pressure compensating volume is arranged in the center of said working fluid line portion replacing the core flow of the working fluid.

11. The burst protection device according to claim 1, wherein the burst protection device comprises at least one bursting body having at least one predetermined breaking section which is exposed to the pressure prevailing in said working fluid line portion and is adjoined by said pressure compensating volume, said predetermined breaking section being designed as a weakened place the mechanical strength of which is reduced in comparison with the surroundings thereof.

12. The burst protection device according to claim 11, wherein the burst body has a substantially streamlined outer shape.

13. The burst protection device according to claim 11, wherein the bursting body is detachably arranged on said burst protection device.

14. The burst protection device according to claim 11, wherein the predetermined breaking section is designed as a bursting disc by which a preferably axial end surface of said inner body is closed in the normal operative state.

15. The burst protection device according to claim 1, wherein the burst protection device is simultaneously designed as an internal temperature control device the temperature of which is controllable at least sectionwise in the area flown around by the working fluid for controlling the temperature of the working fluid.

16. The burst protection device according to claim 14, wherein the pressure relief line serves as a feed line for the supply of the temperature control fluid.

17. The burst protection device according to claim 16, wherein the pressure compensating volume is connected to two feed lines spaced apart in the direction of flow of the working fluid.

18. The burst protection device according to claim 1, wherein the fluid line member comprises a jacket temperature control device for controlling the temperature of the working fluid, said jacket temperature control device surrounding said working fluid line portion at least sectionwise, and the temperature of said jacket temperature control device being controllable by a control device.

19. The burst protection device according to claim 18, wherein the jacket temperature control device comprises a cavity through which a temperature control fluid is flowing, me temperature of the temperature control fluid differing from the temperature of the working fluid.

20. A fluid line member for passing therethrough a spontaneously exothermally reacting working fluid, such as a synthetic polymer, a cellulose derivative or a solution consisting at cellulose, water and amine oxide, comprising the working fluid line portion through which the working fluid is flowing, wherein the fluid line member is provided with a burst protection device according to claim 1.

21. The fluid line member according to claim 20, wherein the fluid line member is provided with an internal temperature control device.

22. A modular fluid line system consisting of at least two fluid line members for passing therethrough a spontaneously exothermally reacting working fluid, comprising a working fluid line portion which has the working fluid flown therethrough, wherein a burst protection device according to claim 1 is mounted between the connection sections of two fluid line members that are arranged one after the other.

23. The modular fluid line system according to claim 22, wherein the burst protection device is mounted between the connecting sections of two successively arranged fluid line members.

24. The modular fluid line system according to claim 22, wherein a fluid line member with a burst protection device alternates with a fluid line member with an internal temperature control device.

25. A facility for passing therethrough and processing a spontaneously exothermally reacting working fluid into molded bodies from a synthetic polymer, a cellulose derivative or a solution consisting of cellulose, water and amine oxide, as well as mixtures thereof, comprising a fluid line system of a modular structure with fluid line members, including a temperature control device or installed apparatus and fittings, and with burst protection devices arranged at regular intervals, wherein there is provided at least one burst protection device designed according to claim 1.

26. The facility according to claim 25, wherein the specific burst protection device arrangement ratio V is less than 3000.

27. The facility according to claim 26, wherein the specific burst protection device arrangement ratio V is less than 2000.

28. The facility according to claim 27, wherein the specific burst protection device arrangement ratio V is less than 1500.

29. The facility according to claim 1, wherein the specific pressure compensating volume is less than 500 liter.

30. The facility according to claim 29, wherein the specific pressure compensating volume is less than 300 liter.

31. The facility according to claim 30, wherein the specific pressure compensating volume is less than 150 liter.

32. The facility according to claim 25, wherein the working fluid is a crystallizing, heat-sensitive working fluid.

33. The burst protection device of claim 1, wherein the spontaneously exothermally reacting working fluid is a cellulose derivative, a solution containing cellulose, water, and amine oxide, or a mixture thereof.

34. The fluid line member of claim 20, wherein the spontaneously exothermally reacting working fluid is selected from the group consisting of a synthetic polymer, a cellulose derivative, or a solution consisting of cellulose, water and amine oxide.

35. The facility of claim 25, wherein the fittings are selected from the group consisting of pumps, filters, heat exchangers, mixing reactors, and ball valves.

36. The facility of claim 32, wherein the crystallizing, heat-sensitive working fluid is a spinning solution containing cellulose, water, a tertiary amine oxide, and stabilizers for the terminal stabilization of the cellulose and the solvent.

37. The facility of claim 36, wherein the tertiary amine oxide is N-methylmorpholine N-oxide (NMMO).

38. The facility of claim 36, wherein the crystallizing, heat-sensitive working solution further comprises additives selected from the group consisting of titanium dioxide, barium sulfate, graphite, carboxymethyl celluloles, polyethylene glycols, chitin, chitosan, alginic acid, polysaccharides, dyes, antibacterially acting compounds, flameproofing agents containing phosphorus, halogens, or nitrogen, activated carbon, carbon blacks or electrically conductive carbon blacks, silicic acid, organic solvents, and mixtures thereof.

39. The modular fluid line system of claim 22, wherein the spontaneously exothermally reacting working fluid is selected from the group consisting of a synthetic polymer, a cellulose derivative, and a solution consisting of cellulose, water and amine oxide.

\* \* \* \* \*